3,261,765
PROCESS OF CONVERTING SEA WATER TO FRESH WATER EMPLOYING AGAVE PLANT JUICE
Claude L. Spray, 40—40 203rd St., Bayside, N.Y.
No Drawing. Filed Oct. 23, 1963, Ser. No. 318,156
1 Claim. (Cl. 203—7)

This application is a continuation-in-part of my prior application Serial No. 169,129, filed January 26, 1962, now abandoned.

The present invention relates to the purificatiton of water, and, more particularly, to an improved process of heating sea water or saline water to produce water vapors suitable for feeding steam boilers or for use as drinking or irrigation water upon condensatiton of the vapors.

It is generally known that the dissolved solids in sea water contain a relatively high percentage of calcium, magnesium and sulphate ions in the form of calcium and magnesium sulphate, and that calcium sulphate forms a hard tenacious scale on metallic surfaces with scale when formed at high temperatures and pressures is practically insoluble and therefore is difficult and almost impossible to remove from the surfaces.

In order to enable sea water to be used as boiler feed water in steam power plant systems, it has been customary to process the sea water in apparatus known as an evaporator. Evaporators generally comprise a closed tank which has an outlet for water vapors and has an inlet for introducing into the tank sea water or returned condensed steam and sea water as make-up feed water, a heat exchanger in the tank through which used or low pressure steam is circulated to heat the water in the tank, and a pump connected to a pit in the bottom of the tank for continuously removing from the tank concentrated brine, water insoluble salts and loose scale which settle in the pit.

As an attempt to minimize scaling in the evaporator, the evaporator is operated at temperatures between about 160° F. and 190° F. When the operating temperature exceeds 190° F. scaling becomes intolerable.

This requires that the outlet of the tank be maintained under a below atmospheric negative pressure or partial vacuum of a value to enable water to be vaporized at temperatures between 160° and 190° F.

Such low temperature and below atmospheric negative pressure operation is recognized to be uneconomical and an ineffective solution in the preventiton of scale formation, but to date is the best known manner of processing sea water for use in steam boilers. Chemicals such as phosphates which are added to the sea water only retard scaling and serve no useful purpose at temperatures above 190° F. Also, the use of chemicals is costly because of the loss thereof due to continuous blow-down or pumping of the pit. This necessitates the addition of relatively large quantities of chemicals to the incoming sea water to maintain a desired concentration of the chemicals in the sea water being processed.

Accordingly, the primary objects of the present invention are to provide an improved process for converting sea water to fresh water which is simple, practical and economical and which eliminates scaling of the equipment utilized.

Other and further objects of the invention will be obvious upon an understanding of the illustrative embodiment about to be described, or will be indicated in the appended claim, and various advantages not referred to herein will occur to one skilled in the art upon employment of the invention in practice.

In accordance with the present invention, I have discovered that sea water can be converted to fresh water by adding a quantity of raw juice of agave plant leaves which juice has been heat treated to prevent fermentation thereof and to preserve its natural sugars and has been centrifuged to remove iron, calcium and magnesium ions to sea water in a confined zone, heating the sea water in the zone to a temperature above its boiling point at atmospheric pressure to produce water vapor in the zone having a positive pressure and withdrawing the water vapor from the zone.

The withdrawn water vapor may be fed to a boiler for producing steam at any desired temperature which eventually is condensed to produce fresh water adapted to be reused in a closed steam power plant system in the conventional manner or adapted to be used for agricultural or industrial purposes or as drinking water after the removal of contaminants which may have been introduced into the steam while doing work. In such use of the water vapor, the confined zone is provided by a boiler feed water evaporator having a sump, pit or basket for collecting loose scale and insoluble salts which is emptied periodically as required to remove such collection together with concentrated brine. Preferably, the salinity of the water is maintained at about 50,000 parts per million of dissolved solids to the evaporator.

Alternatively, the withdrawn water vapor may be fed directly to a condenser for producing fresh water suitable as drinking water or any other desired purpose. In such use of the water vapor, the confined zone is provided by a still which is equipped for the removal of solids and concentrated brine as aforementioned.

It is contemplated that sea water containing the plant juice could be fed directly to a boiler which is constructed to handle the collection and removal of solids and concentrated brine, and that the steam generated by the boiler could be first used for doing work and then be condensed to produce fresh water which may be used as return water in a closed system or for other purposes.

By the term "raw juice of agave plant leaves which has been treated to prevent fermentation thereof" as used herein and in the claim is meant such juice of the agave plant and similar plants which is heat treated so as to preserve the natural sugar thereof known as agavose ($C_{12}H_{22}O_{11}$). The term "raw juice" excludes juice which has been reconstituted by the addition of liquid to solids extracted from raw juice. Such treatment can be accomplished substantially by following the process described in my United States Patent 3,019,193, dated January 30, 1962.

As stated in the patent the raw juice is concentrated immediately to inhibit fermentation thereof. Sufficient alkaline material is admixed with the concentrated juice and the mixture is cooked for a sufficient duration of time to adjust the pH thereof to between about 9 and about 11 and to give the final product an almost black color.

Either or both of the centrifuging steps mentioned in the patented process may be omitted unless the juice is required to have a long shelf life and/or a high purity.

By the term "sea water" or "saline water" as used herein and in the claim is meant ocean water, surface and ground waters and inland brines which have a sufficiently high total dissolved solids contents to make such waters unusable in stills or boilers without treatment thereof to prevent scaling of the evaporating or distilling equipment. Ocean water has a total dissolved solids content between about 30,000 and about 35,000 parts per million by weight. The water at the mouth of rivers affected by tides has a total dissolved solids content which may range from that of ocean water to about several thousand parts per million. Inland brines which are used primarily as a source for producing chemicals dissolved therein by a process of evaporation under partial vacuum have a total dissolved solids content as high as between about 200,000 and about 300,000 parts per million by weight.

By the term "fresh water" as used herein and in the claims is meant water having a total dissolved solids content not exceeding about 20 parts per million by weight. Water suitable for use in conventional steam boilers should have a total dissolved solids content not exceeding about 5 to 6 parts per million by weight.

In practicing the present invention, it has been found that descaling of and prevention of scale formation on metallic parts of evaporators, boiler, stills and the like can be effected by adding one part by volume of raw juice of agave plant leaves which has been treated to prevent fermentation thereof to between about 400 and about 1000 parts by volume of the saline water. Extensive experiments indicated that one part by volume of the plant juice in about 500 parts by volume of water is effective to descale previously used equipment and is effective to prevent scale formation on new or cleaned equipment in most all cases.

When the equipment is clean, the concentration of the plant juice in the water being processed is maintaind at the desired value by the continuous or intermittent addition of about one part by volume of the plant juice to the water being processed for between about 20,000 and 50,000 parts by volume of fresh water produced.

Preferably, the water being processed in the equipment is tested in any conventional manner to determine its pH and the addition of the plant juice to maintain its desired concentration is varied accordingly. This is possible because the treated plant juice has a known pH wherefore the pH of the aqueous mixture reflects the concentration of the plant juice therein.

By keeping the equipment clean and free from scale on metallic heat exchange parts, the U factor or mean coefficient of heat transmission is maintained at a high value to enable the equipment to operate at its maximum efficiency.

As a specific example of the present invention, tests were conducted with sea water distillation equipment having a known output capacity of fresh water when operated at temperatures up to 190° F. About one volume of the "plant juice" having a concentration of about 15° Baumé and having a pH of about 10 was added and mixed with 500 volumes of sea water having a total dissolved solids content of about 32,000 parts per million by weight, and this mixture was introduced into this equipment.

The equipment was operated continuously with steam at about 40 p.s.i.a. to produce a temperature of about 270° F. and a pressure of about 20 p.s.i.a. in the shell of the still. Make-up sea water containing one volume of the "plant juice" per 50,000 volumes of the sea water was introduced as required to maintain the concentration of the "plant juice" in the still at about one volume per about 1500 volumes of water.

It was found after a twenty four hour test that the fresh water output capacity of this equipment was increased about 3.25 times by operating the same in the manner just described over the output capacity of the equipment when operated at 190° F. without the addition of the "plant juice" to the sea water.

The fresh water produced during the twenty four hour test was conventionally tested periodically, and at no time had a total dissolved solids content exceeding 5 parts per million by weight.

The still was blown down once every eight hours and the scale which had been collected was removed therefrom. This scale was relatively soft although the scale contained about 70% by weight of calcium sulphate. After the tests were completed, the shell of the still was opened and the heat exchange elements were inspected. These elements appeared to be free from scale except for a light powdery deposit thereon.

Thus, by the addition of the "plant juice" and higher operating temperatures, the capacity of existing equipment can be greatly increased without scale formatiton on heat exchange parts.

Further tests demonstrated that with the use of the "plant juice" in the manner described herein the equipment can be operated at about 300° F. with even higher efficiency and without damage to the equipment.

From the foregoing description, it will be seen that the present invention provides an improved process of removing solids from water to produce fresh water at a very high rate in a simple, practical and economical manner.

As various changes in carrying out the above process may be made without departing from its scope, it is intended that all matter contained in the foregoing description shall be interpreted as illustrative and not in a limiting sense.

I claim:

The process of continuously operating distillation equipment to convert sea water to fresh water having heat exchange structure, which process comprises maintaining at one side of the heat exchange structure saline water containing as high as 300,000 parts per million of dissolved solids by weight and the saline water containing between 20 and 2000 parts per million by volume of agave plant juice, and applying heat to the other side of the heat exchange structure to heat the saline water to at least above its boiling point at atmospheric pressure and up to 270° F., the agave plant juice being unfermented and concentrated and containing its natural sugars and other ingredients and containing sufficient alkaline material to adjust the pH of the concentrated juice to between about 9 and about 11 and having an almost black color, said process being characterized in that scale forming insolubles in the saline water will form a relatively soft scale which will not adhere to the heat exchange structure and is capable of being blown down to remove the same from the equipment whereby the U factor of the heat exchange structure is maintained at a high value to enable the equipment to operate at is maximum efficiency.

References Cited by the Examiner

UNITED STATES PATENTS

| | | | |
|---|---|---|---|
| 2,042,130 | 5/1936 | Smead | 252—82 |
| 2,733,196 | 1/1956 | Hiller et al. | 203—7 |
| 2,979,442 | 4/1961 | Badger | 203—7 |
| 3,075,924 | 1/1963 | Rubin | 252—82 |
| 3,119,752 | 1/1964 | Checkovich | 203—11 |
| 3,135,670 | 6/1964 | Ristaino et al. | 203—7 |

FOREIGN PATENTS 538,271   7/1941   Great Britain.

NORMAN YUDKOFF, *Primary Examiner.*
ROBERT F. BURNETT, *Examiner.*
W. L. BASCOMB, M. H. SILVERSTEIN,
*Assistant Examiners.*